(12) United States Patent
Sorensen

(10) Patent No.: US 7,775,116 B2
(45) Date of Patent: Aug. 17, 2010

(54) PRESSURE TRANSDUCER WITH ECCENTRIC SLEEVE FOR ADJUSTING THE POSITION OF A PRESSURE PORT

(75) Inventor: Per Hassel Sorensen, Sandnes (NO)

(73) Assignee: Roxar Flow Measurement AS, Bergen (NO)

( * ) Notice: Subject to any disclaimer, the term of this patent is extended or adjusted under 35 U.S.C. 154(b) by 49 days.

(21) Appl. No.: 11/918,062

(22) PCT Filed: Apr. 20, 2006

(86) PCT No.: PCT/NO2006/000147

§ 371 (c)(1),
(2), (4) Date: Mar. 19, 2008

(87) PCT Pub. No.: WO2006/112729

PCT Pub. Date: Oct. 26, 2006

(65) Prior Publication Data

US 2009/0064788 A1    Mar. 12, 2009

(30) Foreign Application Priority Data

Apr. 20, 2005   (NO)   .................................. 20051930

(51) Int. Cl.
  *G01L 19/04*   (2006.01)
(52) U.S. Cl. .......................................... 73/708; 73/756
(58) Field of Classification Search ........... 73/700–756; 361/283.1–283.4
  See application file for complete search history.

(56) References Cited

U.S. PATENT DOCUMENTS 4,466,290 A    8/1984   Frick et al.
6,301,969 B1 *  10/2001  Hess ........................... 73/756
6,912,919 B2 *  7/2005   Shiba et al. .............. 73/861.52

FOREIGN PATENT DOCUMENTS

| CH | 251 710 | 11/1947 |
|---|---|---|
| DE | 1 913 395 | 9/1970 |
| GB | 1913 28156 | 12/1913 |
| JP | 62008029 A * | 1/1987 |
| RU | 2 041 451 | 8/1995 |

OTHER PUBLICATIONS

International Search Report of PCT/NO2006/000147 mailed Jul. 31, 2006.
Norwegian Search Report of NO 2005 1930; Dec. 22, 2005.
Norwegian Search Report of NO 2005 1930; Apr. 24, 2007.
International Preliminary Report on Patentability completed Aug. 10, 2007.

* cited by examiner

*Primary Examiner*—Lisa M Caputo
*Assistant Examiner*—Jermaine Jenkins
(74) *Attorney, Agent, or Firm*—Nixon & Vanderhye PC

(57) ABSTRACT

This invention relates to a pressure measuring instrument, as well as a dedicated liner, especially for subsea use and adapted for coupling to a pressurized medium in a container or pipe through at leas tone opening therein and thus measure the pressure in the medium at this location, wherein the pressure measuring instrument is provided with at least one insertion part for positioning in said opening, the insertion part comprising a outward protruding liner, said liner being rotatably coupled to the insertion part and having an inner cylindrical or conical surface and an outer cylindrical or conical surface, said inner and outer surfaces having non-coinciding parallel or essentially parallel centre axis.

7 Claims, 2 Drawing Sheets

PRESSURE TRANSDUCER WITH ECCENTRIC SLEEVE FOR ADJUSTING THE POSITION OF A PRESSURE PORT

This application is the U.S. national phase of International Application No. PCT/NO2006/000147 filed 20 Apr. 2006, which designated the U.S. and claims priority to NO 20051930 filed 20 Apr. 2005, the entire contents of each of which are hereby incorporated by reference.

This invention relates to a pressure measuring instrument and a sleeve for coupling this to a medium of which the pressure is to be measured.

In subsea equipment for oil and/or gas production there is often a need for measurements of pressure differences. In such measurements pressure is lead through an impulse line from the area in which the pressure arises to a differential pressure measuring instrument reading the pressure difference. What can then easily happen is hydrate formation and pollution which may clog? the relatively thin impulse lines, resulting in erroneous measurements.

As an alternative separating membranes against the gas and/or liquid to be measured. Then a separate pressure transferring liquid is used in the impulse lines for transferring the differential pressure to the to the differential pressure measuring instrument. The chosen pressure transferring liquid will then have good characteristics as pressure transferring medium, so that the problems related to clogging? are avoided.

The disadvantage with such a solution in subsea equipment is that the pressure to be measured is very high and thus it is technically difficult to mount the separating membranes with sufficient strength and sealing. In addition it is difficult to fill the pressure transferring liquid into the cavity behind the separating membranes and impulse lines without the presence of air and pollution, which may create difficulties for the function of the pressure transferring fluid.

It is a great advantage at the assembly of subsea equipment using pressure difference measurements using separating membranes that the separating membranes and impulse lines are already filled with pressure transferring and that the cavities are sealed. The disadvantage is then that the impulse lines and membranes are easily harmed as they constitute a fragile construction compared to the equipment they are mounted on.

It is therefore an essential improvement that the pressure sealing membrane and impulse lines constitutes a unitary assembly with the pressure measuring instrument in which the cavities transferring pressure may be filled with pressure transferring liquid and sealed before the assembly is mounted on subsea equipment.

Units of this kind are found in different versions, a specific embodiment having a fairly large size and consists of a robust water pressure resistant differential pressure measuring instrument body with two separate flanges each containing a pressure sealing membrane and impulse lines to be placed through an opening in the pressure carrier. The two flanges must be fastened to the pressure carrier equipment so as to avoid a strain damaging the sealing ability of the coupling between the flange and the pressure carrying equipment.

As the distance between the flanges is relatively large and the flexibility of the differential pressure measuring instrument body is small, temperature variations between the pressure carrying equipment and the differential pressure measuring instrument body will give a large strain on the flange couplings because of the differences in length variations of the differential pressure measuring instrument body and the pressure carrying equipment. This strain will over several cycles of temperature variations result in wear on the flange sealing if the flange on the differential pressure measuring instrument body and the pressure carrying equipment is allowed to move relative to each other.

This may be remedied by fitting the parts together so that the measuring instrument fits into the pressure carrying instrument so that the sealing surfaces are not allowed to move relative to each other. This is technically possible by producing the measuring instrument and pressure carrying equipment with tight tolerances, but this is very expensive to machine because the parts are often welded and machined in different operations resulting in natural variations in dimensions.

A corresponding problem may occur with measuring instruments having only one insertion part to be fitted into the pressure carrier, but is fastened to other equipment or similar at a distance from the opening in the pressure carrier.

In order to avoid this problem the present invention comprises a solution as described in the independent claims.

By providing at least one insertion part with an eccentric supporting sleeve, lining etc, it is possible to obtain a press fitting between sleeve and measuring instrument and between sleeve and the subsea equipment at the same time as the distance between the two fastening points on the same measuring instrument does not require very precise tolerances. By rotating the support sleeve or sleeve the insertion parts will be adapted to the distance between the openings as long as it is within the distance adjustment being possible with a given eccentricity. By avoiding that the sleeve rotates after the differential pressure measuring instrument body is mounted the a sufficiently strong sleeve will be capable of hindering that the sealing surfaces and the subsea equipment is shifted relative to each other and over time be ruined.

The invention is explained more in detail below with reference to the accompanying drawings, illustrating the invention by way of examples.

Figure 1:
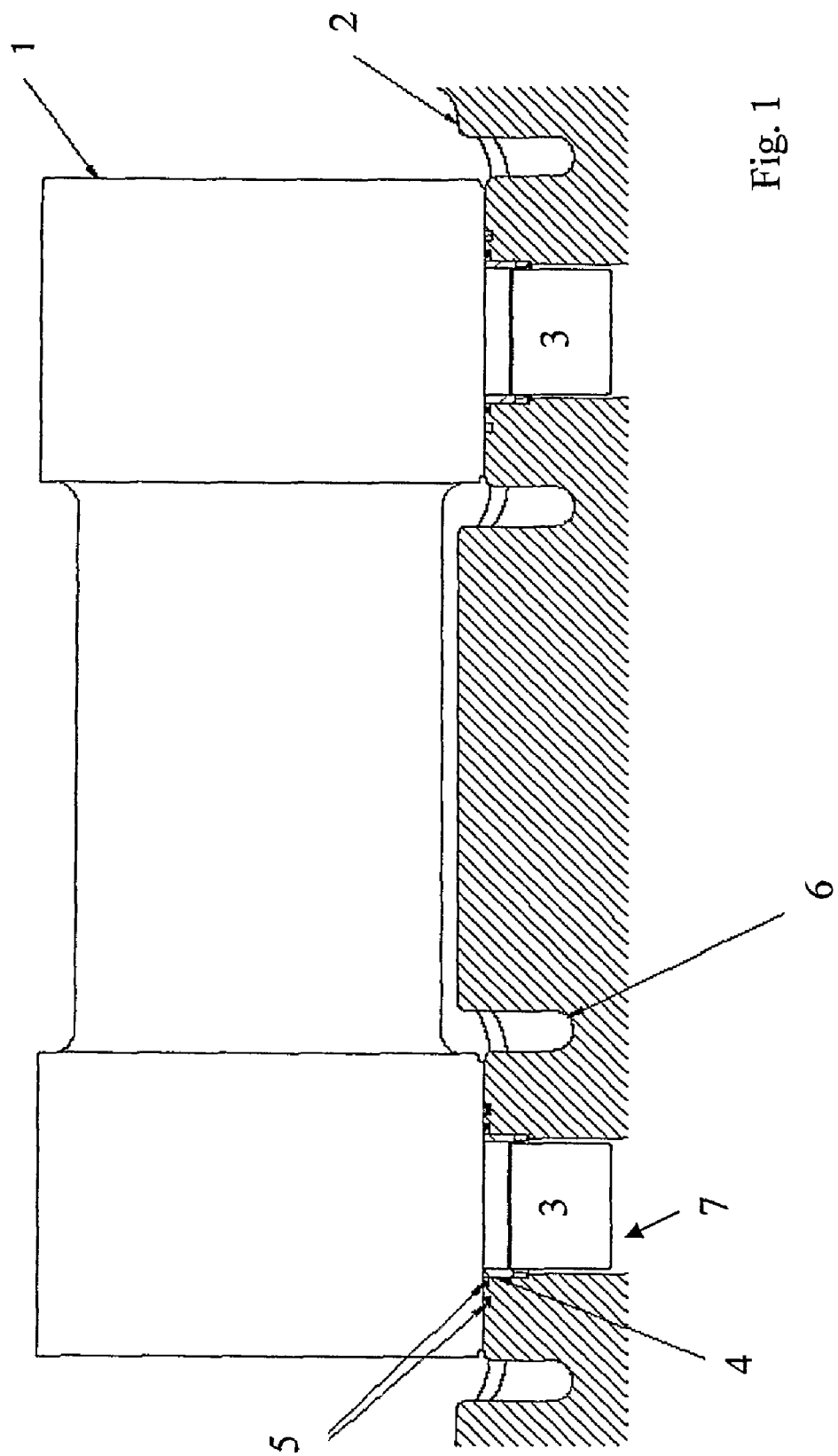
FIG. 1 illustrates a pressure gauge with two insertion parts positioned on a pressure carrier.

In FIG. 1 a pressure measuring instrument 1 is adapted to measure pressure in two positions, or possibly measure the differential pressure between the two places. This is performed with two insertion parts 3 being adapted to enter into openings 7 in a pressure carrier 2. Through these openings the insertion parts 3 comes into pressure contact with the medium inside the pressure carrier 2.

As mentioned above the position of the openings and insertion parts has to correspond if leaks and mis-adaptions are to be avoided. In order to obtain this eccentric sleeves 4 are positioned by at leas tone of the insertion parts. These may be rotated relative to the axis of the insertion parts, so that the centre of the insertion part may be moved when the centre of the inner cylinder or cone is moved during rotation. Thus a slight shift between the pressure gauge and the pressure carrier is allowed. The eccentricity of the sleeve may be very small, e.g. in the range of 0.25 mm on a sleeve having a diameter of 55 mm, see FIG. 2.

Preferably the sleeve is in addition provided with means for avoiding rotation after mounting, for example friction generating parts or adhesives, so that shifts with resulting risk for leaks are avoided. This has to be maintained during large loads, such as pressure differences of 30-80 tons.

The diameters on the sleeve should preferably be made with precision so that the sleeve has a small clearing against the gauge body or pressure sensor for the wanted effect. It may be provided with cylindrical with a smooth diameter in the longitudinal direction or conical with increasing diameter in the longitudinal direction. The latter may simplify the mounting when the margins are small, especially if the outer diameter to be fitted against the pressure carrier is conical.

FIG. 1 shows the preferred embodiment of the invention where the insertion part is positioned in the pressure measuring instrument, but the opposite solution may also be possible in which the coupling parts switched so that the insertion parts are mounted on the pipe and adapted to be introduced into the pressure measuring instrument. Of practical reasons the easiest procedure is to have the rotatable sleeves on the insertion parts, but this may also be done in other ways.

Figure 2:
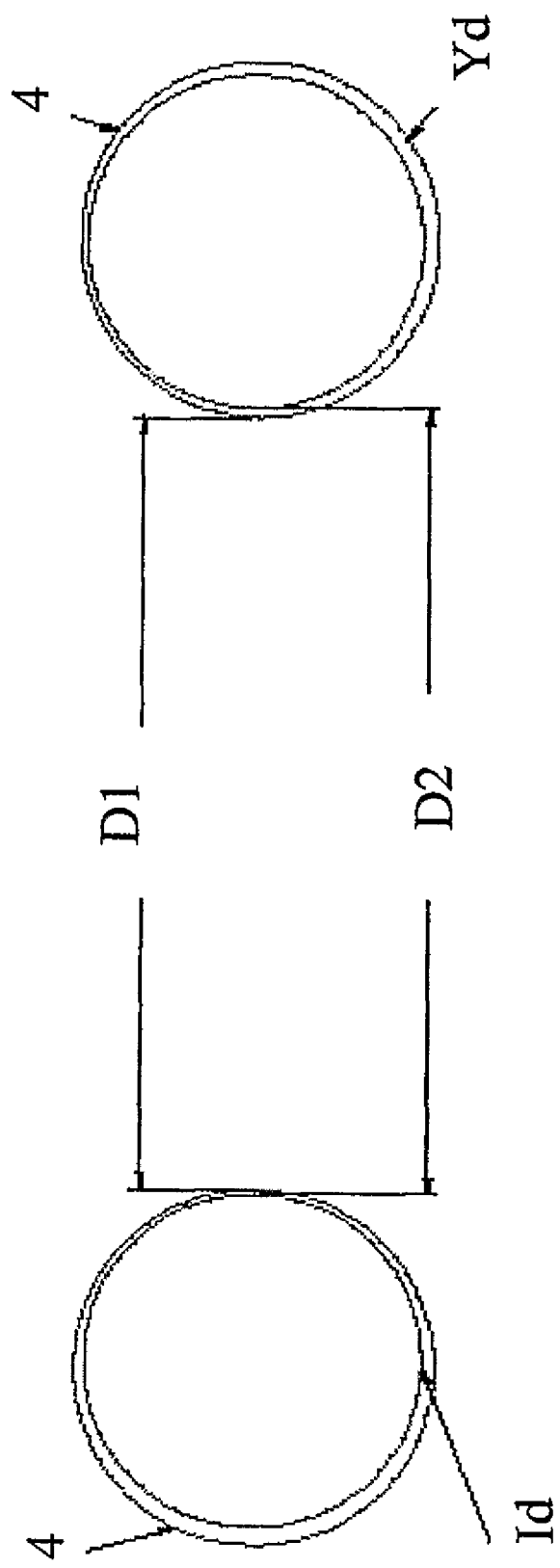
FIG. 2 illustrates the according to the invention adjustable distance between the insertion parts.

In FIG. 2 two sleeves are illustrated, both with an outer diameter Yd fitting into the openings 7 in the pressure carrier 2, and inner diameters Id fitting to the outer diameter of the insertion parts 3. As is evident the sleeves have varying width along the circumference. The distance between the outer diameters D1 is dictated by the distance between the openings and is therefore fixed, while the distance between the inner diameters D2 will vary with the orientation of the sleeve rings. Thus the possibility is obtained to adjust this distance by rotating one or both rings, so as to adapt the distance between the insertion parts 2 to the positions of the openings.

Sealing may be obtained as shown in FIG. 1 where the pressure meter is equipped with a surface grinded flange being pressed against packers 5 in the pressure carrier 2. Alternative embodiments with packers in the openings or related to a seat being coupled to the sleeves may also be contemplated, or the sleeves themselves may have pressure sealing effect after being mounted.

The insertion parts 3 may be provided in many ways, as mentioned above either with a pressure transferring membrane or a passage for the medium in the pressure carrier 2. The measuring instrument per se will usually be fastened to the pressure carrier with methods being well known for a person skilled in the art, and depends on the pressure to be measured. Depending on the situation it is fastened with bolts or just by the coupling to the pressure carrier using the holes 7.

The measurements being performed by the pressure gauge may vary. The two openings may for example be connected to different positioned in a venturi in a pipe constituting a narrowing with different flow area, so that one may measure the pressure differences between the methods and for example provide a measure of the flow rate of the pipe content. It may also measure the absolute pressure at one or both insertion parts. If a sleeve according to the invention is used in one or more openings depends on the presumed need for adjustment. In addition to the sleeve the pressure carrier may be provided with strain relief in the form of a stress reducing neck/recess 6 in the flange to provide an additional reduction in the risk for leaks. This will also absorb strains in the material resulting from dimensional changes in the pressure carrier or measuring instrument.

Thus the mounting may be performed by rotating one or more sleeves to adapt the positions of the instrusive parts 3 to the relative positions of the openings 7. Then the measuring instrument is fastened in a per se known way to the pressure carrier 2, for example by using bolts or adhesives, where the method depends on the pressure conditions and expected strain.

To summarize the present invention relates to the following aspects of pressure measuring instruments where at least one sleeve, supporting sleeve or similar is used having an inner cylindrical or conical surface and an outer cylindrical or conical surface and wherein the inner and outer surfaces have parallel or essentially parallel centre axis which are not coinciding, so that by rotating this relative to one of the centre axis the relative position between the insertion part 3 on the pressure meter 1 and the pressure carrier 2 may be adjusted.

The sleeve may be provided as a seal, but in many cases it will function as support in the coupling while the sealing is obtained using other means, such as packers or similar.

According to one embodiment of the invention relates to a pressure measuring instrument for subsea use having a pressure sealing flange being equipped with an insertion part having a during mounting rotatable sleeve as specified above.

According to another embodiment the invention relates to a pressure measuring instrument for subsea use having two pressure sealing flanges wherein at least one is provided with an insertion part having one during mounting rotatable sleeve as described above.

According to yet another embodiment the invention relates to a differential pressure measuring instrument for subsea use having at least two pressure sealing flanges wherein at least one is provided with an insertion part having one during mounting rotatable sleeve as described above.

According to yet another embodiment the invention relates to a absolute pressure measuring instrument for subsea use having at least two pressure sealing flanges wherein at least one is provided with an insertion part having one during mounting rotatable sleeve as described above.

The invention also relates to the use of a sleeve or similar in pressure measuring instrument for subsea use wherein the sleeve has an inner cylindrical of conical bearing surface and an outer cylindrical or conical bearing surface, the inner and outer bearing surfaces having parallel or essentially parallel centre axis being non-coinciding. The sleeve preferably has two bearing surfaces being cylindrical or conical and having parallel or essentially parallel axis, and may be adapted to avoid rotation relative to its outer bearing surface. A sleeve as described above having a distance between the bearing surfaces being much less than the bearing surface diameter.

The invention claimed is:

1. Pressure measuring instrument, for subsea use and adapted to be coupled to a pressurized medium in a container or pipe and thus measure the pressure of the medium, comprising: a first coupling part for coupling to a corresponding second coupling part on said pipe or container, one of said coupling parts being constituted by an insertion part with pressure communication to the pressure measuring instrument, and the other of said coupling parts being constituted by an opening for receiving said insertion part, and a sleeve being rotatably coupled to at least one of said coupling parts and having an inner cylindrical or conical surface and an outer cylindrical or conical surface, the inner and outer surfaces having non-coinciding parallel or essentially parallel centre axis, so that the inner surface of the sleeve is arranged to be held towards the insertion part and the outer surface of the sleeve is arranged to be held towards the opening for receiving the insertion part.

2. Pressure measuring instrument according to claim 1, wherein the first coupling part is constituted by an insertion part, and said sleeve being rotatably coupled thereto.

3. Pressure measuring instrument according to claim 2, comprising to of said insertion parts, each being provided with said sleeve.

4. Pressure measuring instrument according to claim 3, wherein the pressure measuring instrument is constituted by a differential pressure measuring instrument for subsea use adapted to measure the pressure difference between said two insertion parts.

5. Pressure measuring instrument according to claim 3, wherein the pressure measuring instrument is constituted by an absolute pressure measuring instrument for subsea use having at least two said insertion parts wherein at least one is provided with said rotatable sleeve.

6. Pressure measuring instrument according to claim 1, wherein the sleeve is provided by a pressure sealing flange on the insertion part.

7. Pressure measuring instrument according to claim 1, wherein at least one opening is provided with a strain relief, e.g. constituted by a strain reducing neck or recess surrounding the opening.

* * * * *